United States Patent
Elshaer et al.

(10) Patent No.: US 10,173,542 B2
(45) Date of Patent: Jan. 8, 2019

(54) WIRELESS CHARGING SYSTEM COIL ALIGNMENT

(71) Applicant: Ford Global Technologies, LLC, Dearborn, MI (US)

(72) Inventors: Mohamed Elshaer, Dearborn, MI (US); Christopher W. Bell, Livonia, MI (US); James A. Lathrop, Saline, MI (US); John Paul Gibeau, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 207 days.

(21) Appl. No.: 15/183,872

(22) Filed: Jun. 16, 2016

(65) Prior Publication Data

US 2017/0361723 A1    Dec. 21, 2017

(51) Int. Cl.
| | |
|---|---|
| *H02J 7/00* | (2006.01) |
| *H01F 27/42* | (2006.01) |
| *H01F 37/00* | (2006.01) |
| *B60L 11/18* | (2006.01) |

(52) U.S. Cl.
CPC ......... *B60L 11/1829* (2013.01); *B60L 11/182* (2013.01); *B60L 11/1811* (2013.01)

(58) Field of Classification Search
CPC ........................................................ H02J 7/025
USPC ........................................................... 320/108
See application file for complete search history.

(56) References Cited

U.S. PATENT DOCUMENTS

| | | |
|---|---|---|
| 4,716,353 A | 12/1987 | Engelmann |
| 2014/0015328 A1* | 1/2014 | Beaver ................. B60L 11/182 307/104 |
| 2014/0285030 A1* | 9/2014 | Nakamura ............. H02J 5/005 307/104 |

* cited by examiner

*Primary Examiner* — Edward Tso
*Assistant Examiner* — Ahmed Omar
(74) *Attorney, Agent, or Firm* — David Kelley; Brooks Kushman P.C.

(57) ABSTRACT

A vehicle system includes a controller configured to, responsive to an alignment mode, disable a power rectifier configured to transfer charge between a secondary coil and battery, and enable a precision rectifier to output a voltage responsive to current induced in the secondary coil resulting from current through a corresponding primary coil, and responsive to the voltage exceeding a threshold, enable the power rectifier and disable the precision rectifier.

19 Claims, 5 Drawing Sheets

WIRELESS CHARGING SYSTEM COIL ALIGNMENT

TECHNICAL FIELD

The present disclosure relates to systems and methods for aligning a primary coil and a secondary coil of a wireless charging system.

BACKGROUND

The term "electric vehicle" can be used to describe vehicles having at least one electric motor for vehicle propulsion, such as battery electric vehicles (BEV) and hybrid electric vehicles (HEV). A BEV includes at least one electric motor, wherein the energy source for the motor is a battery that is re-chargeable from an external electric grid. An HEV includes an internal combustion engine and one or more electric motors, wherein the energy source for the engine is fuel and the energy source for the motors is a battery. The HEV battery may be a larger capacity battery that is rechargeable from the external electric grid and may serve as the main source of energy for vehicle propulsion until the battery depletes to a low energy level, at which time the HEV may at least partly rely on the internal combustion engine for vehicle propulsion.

SUMMARY

A vehicle system includes a controller configured to, responsive to an alignment mode, disable a power rectifier configured to transfer charge between a secondary coil and battery, and enable a precision rectifier to output a voltage responsive to current induced in the secondary coil resulting from current through a corresponding primary coil, and responsive to the voltage exceeding a threshold, enable the power rectifier and disable the precision rectifier.

A method for a vehicle includes responsive to an alignment mode, disabling by a controller a power rectifier configured to transfer charge between a secondary coil and battery, and enabling a precision rectifier to output a voltage responsive to current induced in the secondary coil resulting from current through a corresponding primary coil, and responsive to the voltage exceeding a threshold, enabling the power rectifier and disabling the precision rectifier.

A method for a vehicle includes issuing by a controller commands prompting a change in a position of a secondary coil responsive to a voltage across the secondary coil, generated as a result of circulating no more than 1 ampere of current through a primary coil and output by a precision rectifier, being less than a threshold, and enabling a power rectifier to transfer charge between the secondary coil and a battery responsive the voltage being above the threshold.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
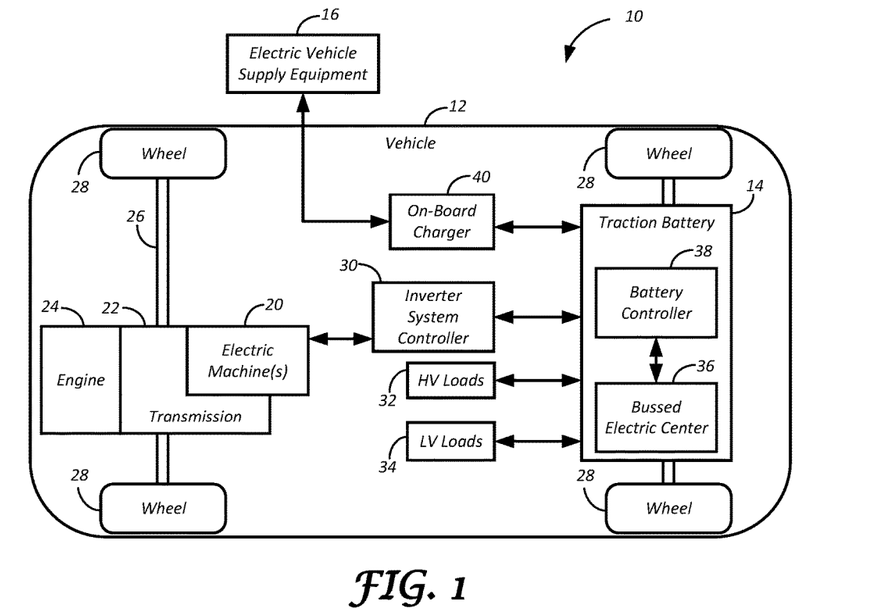
FIG. 1 is a block diagram illustrating a power system of a typical hybrid-electric vehicle (HEV)

FIG. 1 depicts a hybrid-electric vehicle (HEV) power system 10. An HEV 12, hereinafter vehicle 12, may comprise a hybrid transmission 22 mechanically connected to an engine 24 and a drive shaft 26 driving wheels 28. The hybrid transmission 22 may also be mechanically connected to one or more electric machines 20 capable of operating as a motor or a generator. The electric machines 20 may be electrically connected to an inverter system controller (ISC) 30 providing bi-directional energy transfer between the electric machines 20 and at least one traction battery 14.

While FIG. 1 depicts a hybrid electric vehicle, the description herein is equally applicable to a pure electric vehicle. For a pure electric vehicle, e.g., battery electric vehicle (BEV), the hybrid transmission 22 may be a gear box connected to the electric machine 20 and the engine 24 may not be present. The various components discussed may have one or more associated controllers to control and monitor the operation of the components. The controllers may communicate via a serial bus (e.g., Controller Area Network (CAN)) or via discrete conductors.

The traction battery 14 typically provides a high voltage (HV) direct current (DC) output. In a motor mode, the ISC 30 may convert the DC output provided by the traction battery 14 to a three-phase alternating current (AC) as may be required for proper functionality of the electric machines 20. In a regenerative mode, the ISC 30 may convert the three-phase AC output from the electric machines 20 acting as generators to the DC input required by the traction battery 14. In addition to providing energy for propulsion, the traction battery 14 may provide energy for high voltage loads 32, such as compressors and electric heaters, and low voltage loads 34, such as electrical accessories, an auxiliary battery, and so on.

The traction battery 14 may comprise a plurality of battery cells (not shown), e.g., electrochemical cells, electrically connected to a bussed electrical center (BEC) 36, or a plurality of connectors and switches enabling the supply and withdrawal of electric energy to and from the battery cells. Other types of energy storage device implementations, such as capacitors, are also contemplated. A battery controller 38 may be electrically connected to the BEC 36 and may control, such as by outputting a signal to the BEC 36, energy flow to and from the battery cells via the BEC 36. In one example, the battery controller 38 may be configured to monitor and manage temperature and state of charge of each of the battery cells. The battery controller 38 may be further configured to output a signal to the BEC 36 indicative of a request to enable the supply and withdrawal of electric energy in response to detecting that temperature and/or SOC of the battery cells is above or below a specified threshold or in response to a signal or request received from another vehicle controller, such as, but not limited to, chassis controller, powertrain controller, brake controller, heating ventilation and air conditioning controller, and so on.

The vehicle 12 may be configured to recharge the traction battery 14 via a connection to a power source. The battery controller 38 may, for example, be in communication with an on-board power conversion controller (hereinafter, charger) 40 configured to control or regulate charging of the traction battery 14. The charger 40 may be in communication with electric vehicle supply equipment (EVSE) 16 to coordinate the delivery of power to the vehicle 12.

The charger 40 may be configured to transmit a signal to the battery controller 38 indicative of a request to charge the traction battery 14 in response to determining that the vehicle 12 has been connected to the EVSE 16. In one example, the vehicle 12 may include a charge port (not shown) configured to cooperate with a charge connector (not shown) of the EVSE 16. As will be described at least in reference to FIG. 2, the vehicle 12 may be configured to receive wireless charging, such as via a charge transfer using an electromagnetic field.

In response to receiving the request from the charger 40, the battery controller 38 may command the BEC 36 to open or close one or more switches, e.g., positive and negative main contactors, enabling the transfer of electric energy between the EVSE 16 and the traction battery 14. In one example, the charger 40 may condition the power supplied from the EVSE 16 to provide the proper voltage and current levels to the traction battery 14.

Figure 2:
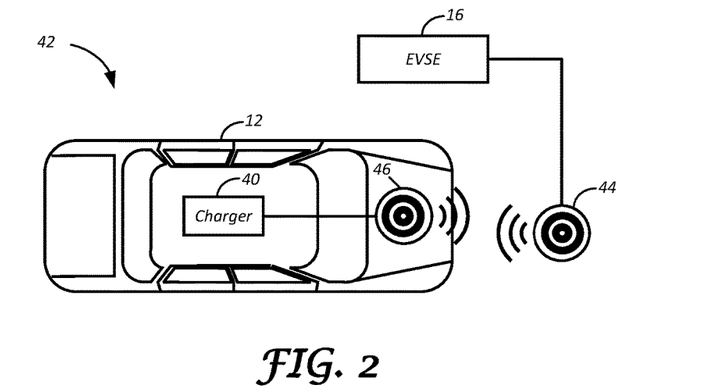
FIG. 2 is a block diagram illustrating coils of a wireless charging system.

Shown in FIG. 2 is an example wireless charging system 42 for the traction battery 14 of the vehicle 12. In one instance, the EVSE 16 may be electrically connected to and configured to power a primary coil 44. In such an instance, passing alternating current through the primary coil 44 may cause the primary coil 44 to emit energy such as electromagnetic energy. Energy emitted by the primary coil 44 may induce current in a secondary coil 46 of the vehicle 12 when the secondary coil 46 is positioned within a predefined distance threshold of the primary coil 44. The secondary coil 46 may be electrically connected to and powered by the charger 40 of the vehicle 12. In one example, the secondary coil 46 may be configured to transmit a signal to the charger 40 in response to detecting that the primary coil 44 of the EVSE 16 capable of providing wireless charging is available within a predefined distance. The secondary coil 46 may, for instance, detect a proximity of the primary coil 44 based on magnitude of current induced in the secondary coil 46 by the primary coil 44.

In one example, the primary coil 44 and the secondary coil 46 may be positioned inside inductive charge plates (not shown) of the EVSE 16 and the vehicle 12, respectively. The vehicle 12 may further include an AC/DC converter (not shown) configured to rectify and filter the AC input received from the EVSE 16 into DC output that may be used to charge the traction battery 14. The primary coil 44 of the EVSE 16 may be positioned in one of a variety of locations with respect to the vehicle 12, such as, but not limited to, underneath, in front of, behind, to a left or right side, above and so on. The primary coil 44 and/or the inductive charge plate of the EVSE 16 may be aligned with respect to each other or with respect to the secondary coil 46 of the vehicle 12 to create a suitable gap to facilitate energy transfer to the vehicle 12.

In one example, the secondary coil 46 of the vehicle 12 may be positioned in one of a variety of locations on the vehicle 12, such as, but not limited to, underside, roof, front or rear bumper, and so on. In another example, the primary coil 44 and the secondary coil 46 may be positioned in a variety of spatial configurations with respect to each other, as well as, their corresponding inductive charge plates, such as, but not limited to, horizontal, vertical, offset by a predefined angle in one or more spatial dimensions, and so on.

Prior to initiating an energy transfer from the EVSE 16, the vehicle 12 may be configured to change positions with respect to the EVSE 16 in response to a predefined signal, such as in response to a signal from the secondary coil 46 that the primary coil 44 of the EVSE 16 capable of providing wireless charging is available within a predefined distance. In one example, the vehicle 12, e.g., via one or more commands issued by the charger 40, may be configured to change position of (or align) the vehicle 12 with respect to the EVSE 16 such that a coupling coefficient between the secondary coil 46 and the primary coil 44 is greater than a coefficient threshold, where the coupling coefficient may be a ratio of an actual mutual inductance of the coils 44, 46 to a maximum possible inductance of the coils 44, 46.

The vehicle 12, e.g., via the charger 40, may be further configured to align the vehicle 12 with respect to the EVSE 16 such that the distance of the secondary coil 46 with respect to the primary coil 44 is less than a distance threshold. In yet another example, the vehicle 12, such as, for example, via the charger 40, may be configured to align the vehicle 12 with respect to the EVSE 16 such that voltage induced in the secondary coil 46 is greater than a voltage threshold, where the voltage may be induced by an oscillating magnetic field of the primary coil 44 generated using circulation of alternating current. These are merely examples and other methods for establishing relative alignment of the primary and the secondary coils 44, 46 are also contemplated.

The charger 40 of vehicle 12 may be configured to initiate an alignment procedure of the vehicle 12 with respect to the EVSE 16 in response to receiving a signal from the EVSE 16 indicating that wireless charging is available. The charger 40 may be configured to initiate the alignment procedure of the vehicle 12 by transmitting a signal to one or more controllers (not shown) of the vehicle 12 configured to change position of the vehicle 12 to a predefined position.

The charger 40 may, for example, output a request to the one or more controllers of the vehicle 12 to change position of the vehicle 12 such that the distance of the secondary coil 46 with respect to the primary coil 44 is less than a distance threshold, the voltage induced in the secondary coil 46 is greater than a voltage threshold, and so on. In another example, the charger 40 may be configured to initiate the alignment procedure of the vehicle 12 by issuing one or more audio and/or video instructions to a vehicle driver to change position of the vehicle 12 such that the distance of the secondary coil 46 with respect to the primary coil 44 is less than a distance threshold, the voltage induced in the secondary coil 46 is greater than a voltage threshold, and so on. These are merely examples for initiating an alignment procedure of the secondary coil 46 with respect to the primary coil 44 and other methodologies and approaches are also contemplated.

A magnitude of an oscillating magnetic field generated by the primary coil 44 in response to the EVSE 16 circulating alternating current through the primary coil 44 may be proportional to an amount of the circulated current. The magnitude of the magnetic field B along the primary coil 44 may be measured in units of tesla (T) and may be expressed using Equation (1):

$$B = \frac{\mu_0 IN}{l} = \mu_0 In, \qquad (1)$$

where $\mu_0$ may represent permeability of free space, I is electric current, N may represent a total number of turns of wire in the primary coil 44, l may represent a length of the primary coil 44, and n may represent a number of turns of wire per unit length of the primary coil 44.

A magnitude of an electric field E generated as a result of the oscillating magnetic field may be expressed using Equation (2):

$$E = \frac{kQ}{d^2}, \qquad (2)$$

where k may represent a proportionality (or Coulomb's law) constant associated with a medium, e.g., air, surrounding the coils, Q may represent a quantity of charge in units of Coulombs (C), and d may represent a distance between the primary coil 44 and the secondary coil 46.

Oscillating electric and magnetic fields may, in one example, generate electromagnetic waves that may be characterized using frequency and/or wavelength. Magnitude of the oscillating electric and magnetic fields may further be proportional to frequency and/or wavelength of the generated electromagnetic waves. In one instance, the EVSE 16 may be configured to control the amount of current circulated in the primary coil 44 such that frequency and/or wavelength of electromagnetic waves generated by the oscillating electromagnetic fields is less than a frequency threshold and a wavelength threshold, respectively. In another example, the EVSE 16 may be configured to control the amount of current circulated in the primary coil 44 such that magnitude of the generated electric and/or magnetic fields is less than a predefined magnitude threshold, e.g., less than 1 ampere (A).

Figure 3A:
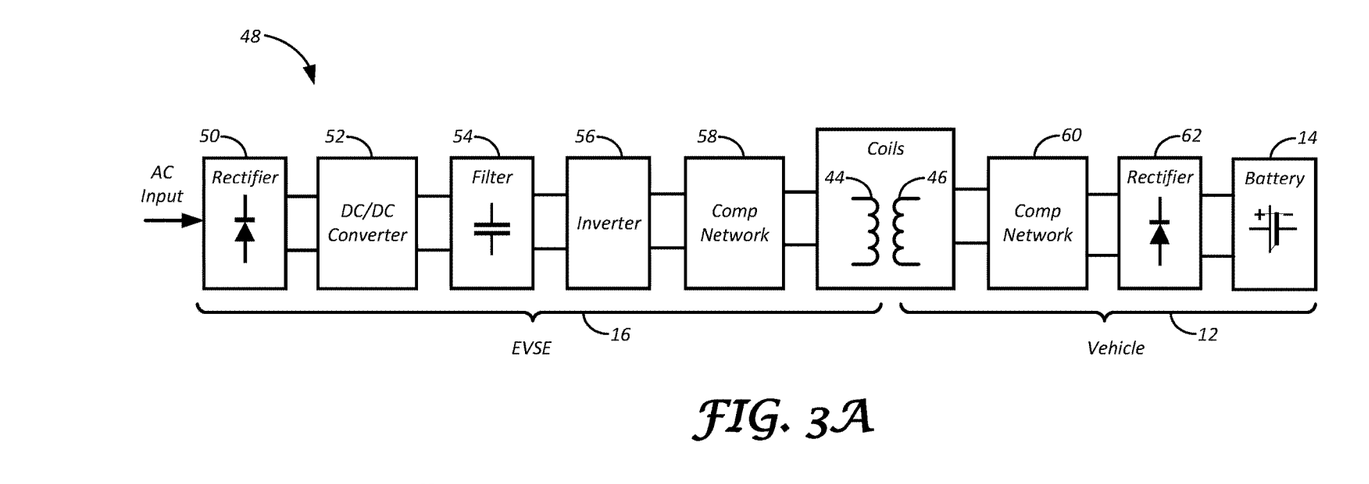
FIG. 3A is a block diagram illustrating the wireless charging system.

In reference to FIG. 3A, an example alignment system 48 for charging the traction battery 14 of the vehicle 12 using wireless charging is shown. The EVSE 16 may be configured to power, e.g., circulate a predefined amount of current through, the primary coil 44 using one or more electrical or electronic systems, sub-systems, digital and/or analog circuit components, and so on. In one example, the EVSE 16 may include an EVSE rectifier 50, a DC/DC converter 52, a filter 54, an inverter 56, and an EVSE compensation network 58.

The EVSE rectifier 50 may be configured to convert received AC, such as AC supplied by a power grid or another power source, to DC. The DC/DC converter 52 may be configured to step-up (or boost) DC input received from the EVSE rectifier 50 to a predefined DC output. In one example, the DC/DC converter 52 in combination with the filter 54, e.g., a bulk capacitor, may comprise a power factor correction (PFC) converter configured to improve power factor and/or reduce harmonic content that may be introduced into the input power by the EVSE rectifier 50. The inverter 56 may be a bridge inverter configured to convert DC output of the power factor correction stage to AC waveform having a predefined frequency. The EVSE compensation network 58 may be configured to adjust a phase-shift angle of a signal output by the inverter 56 such that an output signal of the primary coil 44 has a predefined magnitude.

Output of the EVSE compensation network 58 may be configured to energize (or power) the primary coil 44 such that the primary coil 44 generates an oscillating magnetic field having a predefined magnitude. The voltage or energy output by the primary coil 44, e.g., via an oscillating magnetic field, may induce current in the secondary coil 46 of the vehicle 12. The vehicle 12 may further include a vehicle compensation network 60 configured to adjust frequency of the current induced in the secondary coil 46 to be a predefined frequency, e.g., a predefined switching frequency.

A vehicle power rectifier 62 may be configured to convert AC output of the vehicle compensation network 60 to DC output compatible with the traction battery 14. In one example, voltage and/or current at the output of the power rectifier 62 may be indicative of a relative alignment of, e.g., distance between, the secondary coil 46 and the primary coil 44. In another example, voltage output of the power rectifier 62 may be indicative of a relative alignment of the primary and the secondary coils 44, 46 as defined by a coupling coefficient k. The coupling coefficient k may be a fractional number between 0 and 1, where 0 indicates no inductive coupling and 1 indicates full or maximum inductive coupling. In one example, the coupling coefficient k having a value greater than 0.5 may be indicative of a tight coupling between the primary and the secondary coils 44, 46 and the coupling coefficient k having a value less than 0.5 may be indicative of a loose coupling between the primary and the secondary coils 44, 46. The coupling coefficient k may be a function of, for example, but not limited to, geometry, material, inductance, and other properties and characteristics associated with the primary and the secondary coils 44, 46.

Figure 3B:
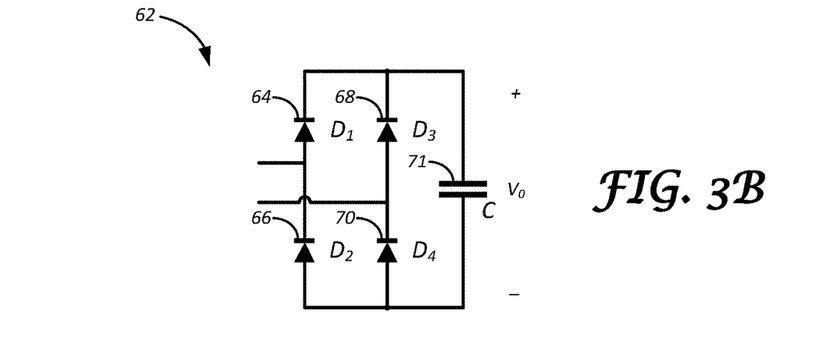
FIG. 3B is a schematic diagram illustrating a power rectifier.

As shown in FIG. 3B, the power rectifier 62 may include a filter capacitor 71 connected in parallel with diodes $D_1$, $D_2$, $D_3$, and $D_4$ 64, 66, 68, and 70, respectively, arranged in a full-bridge configuration. Each of the diodes $D_1$-$D_4$ may have an associated forward voltage drop, e.g., 0.7 V-0.9 V. When the EVSE 16 circulates through the primary coil 44 alternating current below a predefined current threshold, e.g., less than 1 A, voltage and/or current induced in the secondary coil 46 of the vehicle 12 may be less than the forward voltage drop of the diodes $D_1$, $D_2$, $D_3$, and $D_4$ 64, 66, 68, and 70, respectively.

Figure 4:
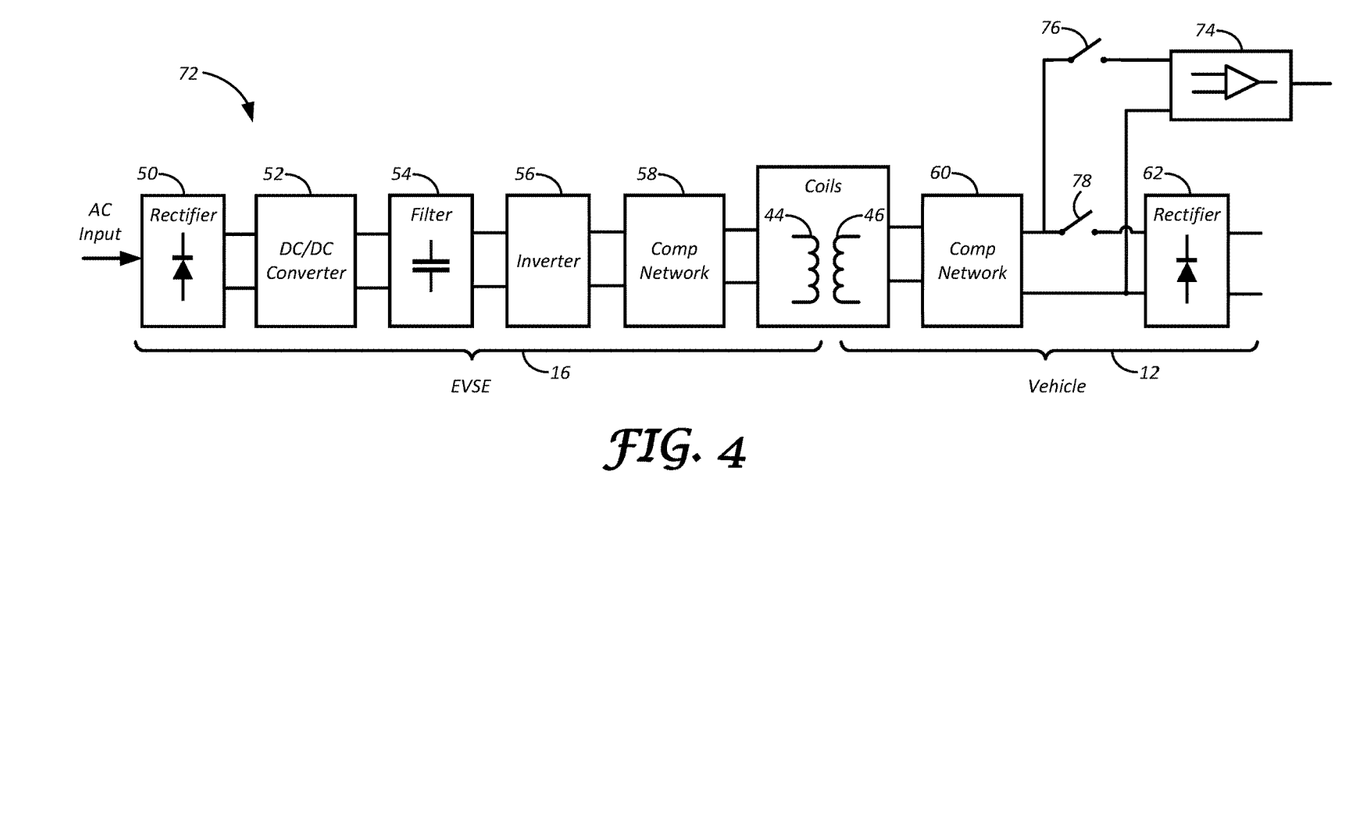
FIG. 4 is a block diagram illustrating a wireless charging system including a precision rectifier.

In reference to FIG. 4, an example alignment system 72 for aligning the vehicle 12 with respect to EVSE 16 based on voltage resulting from circulation of low alternating current, e.g., less than 1 A, is shown. The vehicle 12 may include a precision rectifier 74 configured to convert voltage induced in the secondary coil 46 by low alternating current, e.g., less than 1 A, circulated in the primary coil 44. In one example, the precision rectifier 74 may be configured to amplify voltage induced in the secondary coil 46 by low alternating current, e.g., less than 1 A, circulated in the primary coil 44. Voltage output by the precision rectifier 74 may be indicative of a relative alignment of the primary and the secondary coils 44, 46 as defined by a coupling coefficient k. The charger 40 may be configured to determine the coupling coefficient k using voltage output of the precision rectifier 74. The charger 40 may be configured to enable the precision rectifier 74 during the alignment procedure. The charger 40 may be also configured to disable the precision rectifier 74 following completion of the alignment procedure.

In one instance, the charger 40 may be configured to enable and disable the precision rectifier 74, such as by causing a switch 76 to close and open, in response to receiving a predefined signal. The charger 40 may, for example, enable the precision rectifier 74, e.g., by causing the switch 76 to close, in response to receiving a wireless signal from the EVSE 16 indicating that wireless charging is available. In another example, the charger 40 may disable the precision rectifier 74, e.g., by causing the switch 76 to open, in response to determining that the alignment procedure is complete. These are merely examples and enabling and disabling of the precision rectifier 74 in response to other commands, signals, inputs, outputs, as well as, by other electrical or electronic means is also contemplated.

The charger 40 may be further configured to enable and disable the power rectifier 62, for example, by causing a switch 78 to close and open, respectively. The charger 40 may also be configured to enable and disable the power rectifier 62, e.g., by causing the switch 78 to open or close, in response to receiving a predefined signal. The charger 40 may, for example, enable the power rectifier 62, e.g., by causing the switch 78 to close, in response to receiving a wireless signal from the EVSE 16 indicating that wireless charging is available. In another example, the charger 40 may enable the power rectifier 62, e.g., by causing the switch 78 to close, in response to determining that the alignment procedure is complete. These are merely examples and enabling and disabling of the power rectifier 62 in response to other commands, signals, inputs, outputs, as well as, by other electrical or electronic means is also contemplated.

Figure 5:
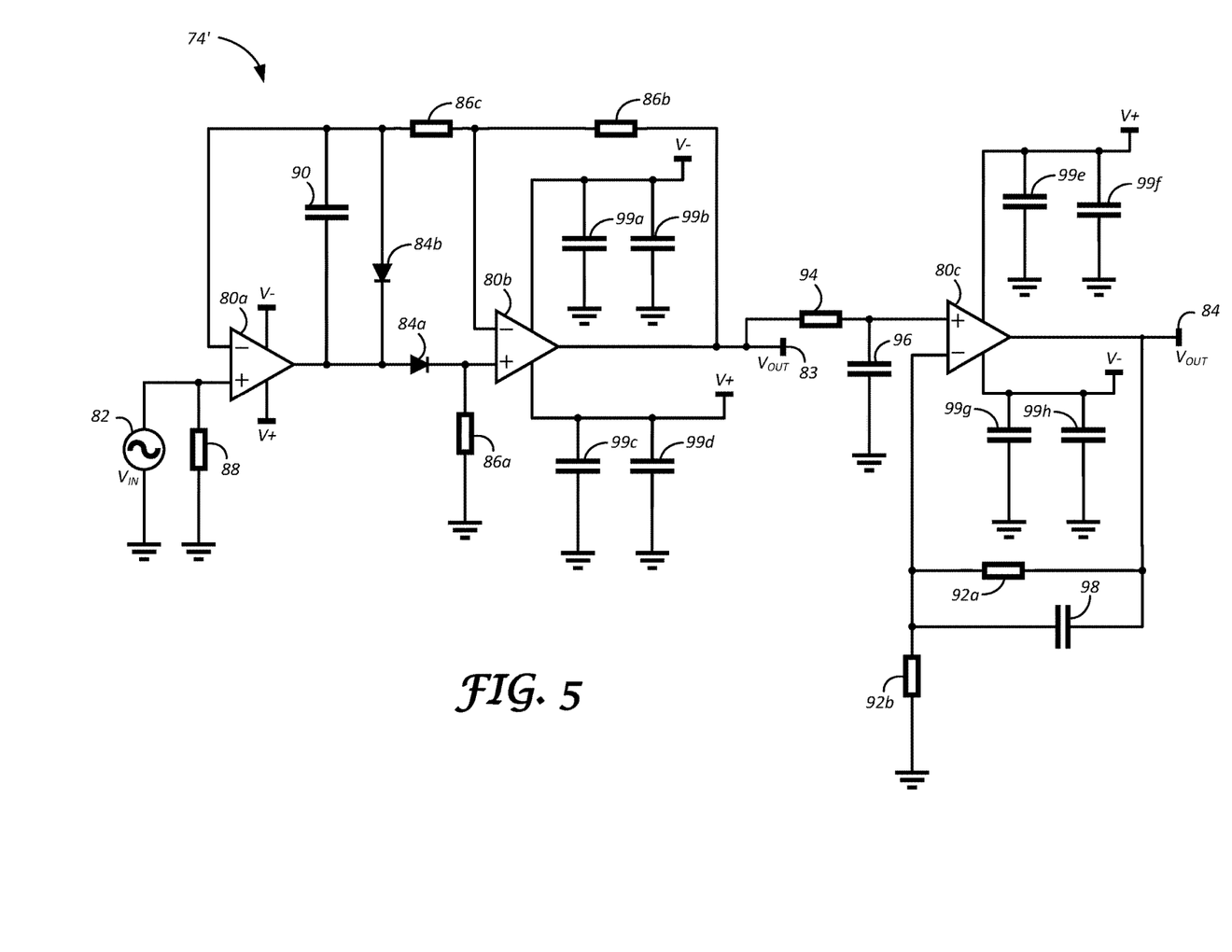
FIG. 5 is a schematic diagram illustrating a precision rectifier.

In reference to FIG. 5, an example precision rectifier 74' for aligning coils of a wireless charging system is shown. The precision rectifier 74' may be configured to receive an AC input signal 82, e.g., output generated by the secondary coil 46 and the vehicle compensation network 60. The precision rectifier 74' may be further configured to amplify the received AC input signal 82 to generate an amplified output signal 84. The precision rectifier 74' may, for example, include a plurality of operational amplifiers 80a-80c, such as differential amplifiers, configured to generate the amplified output signal 84 based on a voltage difference between voltage received at two input terminals of at least one of the operational amplifiers 80a-80c and a negative feedback to the input signal.

In one example, the operational amplifiers 80a and 80b may each be powered by a power supply (indicated generally using V+/V− symbols) and may be configured to convert (rectify) the received AC input signal 82 to DC output signal 83. The operational amplifiers 80a and 80b may, for instance, act as buffers generating an output voltage equal to an input voltage in response to the AC input signal 82 being positive, i.e., in response to a diode 84a being forward biased and a diode 84b being reverse biased. The operational amplifier 80a may, in another example, drive an inverting input of the operational amplifier 80b generating an output voltage that is an inverse of an input voltage with unity gain (e.g., where resistors 86b and 86c are equal in value) in response to the AC input signal 82 being negative, e.g., such that the diode 84a is reverse biased, the diode 84b is forward biased, and a resistor 86a biases non-inverting input terminal of the operational amplifier 80b to ground. A resistor 88 may be sized to control input impedance of the operational amplifier 80a and a capacitor 90 may be sized to smooth high-frequency harmonics of (e.g., low-pass filter) a negative feedback signal of the operational amplifier 80a thus assisting in stabilizing the output signal of the operational amplifier 80a.

The operational amplifier 80c may be a non-inverting amplifier configured to amplify the DC output signal 83 of the operational amplifier 80b and output the amplified output signal 84. The operational amplifier 80c may receive the DC output signal 83 of the operational amplifier 80b at a non-inverting input terminal of the operational amplifier 80c. A gain of the operational amplifier 80c, e.g., amount of amplification applied to the DC output signal 83 by the operational amplifier 80c, may be based on a ratio of resistors 92a and 92b positioned on a negative feedback path of the operational amplifier 80c. A resistor 94 and a capacitor 96 may be sized to low-pass filter input signal to the operational amplifier 80c and a capacitor 98 may be sized to smooth high-frequency harmonics of (e.g., low-pass filter) a negative feedback signal of the operational amplifier 80c thus assisting in stabilizing the amplified output signal 84 of the operational amplifier 80c. In one example, the power supply lines V+/V− of at least one of the plurality of the operational amplifiers 80a-80c may include one or more bypass capacitors, such as bypass capacitors 99a-99h, configured to transfer high frequencies present in the power supply lines V+/V− to ground.

Figure 6:
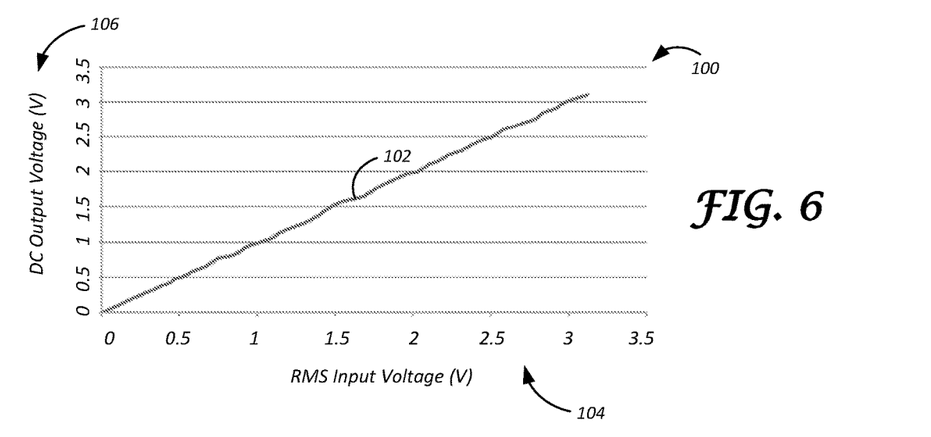
FIG. 6 is a graph illustrating input versus output of the precision rectifier.

In reference to FIG. 6, an example graph 100 illustrating a voltage output of an alignment system using the precision rectifier, such as the precision rectifier 74' described in reference to at least FIG. 5, is shown. For instance, a curve 102 may represent a direct relationship between root-mean-square (RMS) value of input voltage 104 to the precision rectifier 74' and a DC output voltage 106 of the precision rectifier 74'.

Figure 7:
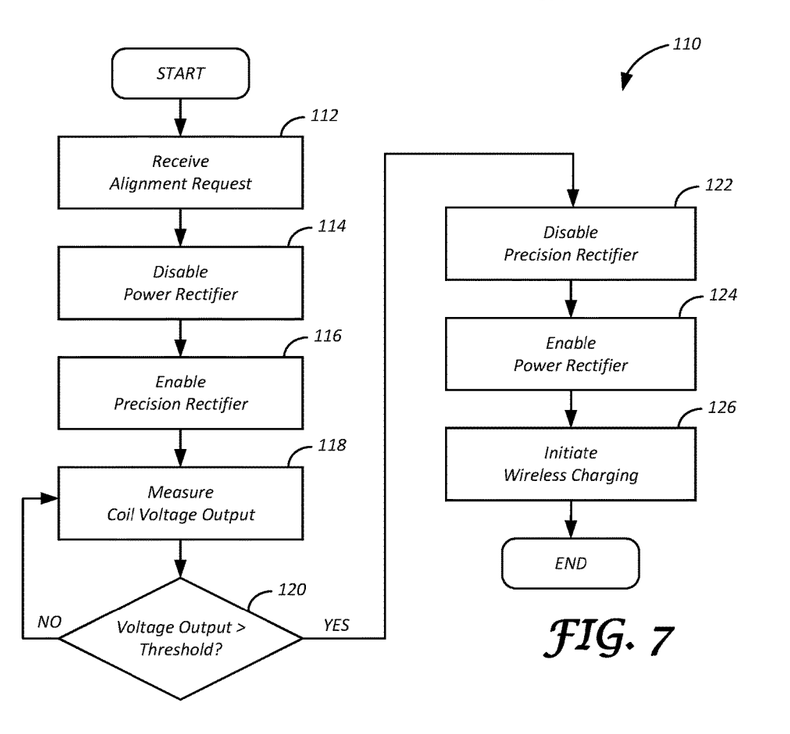
FIG. 7 is a flowchart illustrating an algorithm for performing alignment of the wireless charging system.

In reference to FIG. 7, an example process 110 for performing an alignment procedure for a wireless charging system using a precision rectifier is shown. The process 110 may begin at block 112 where the charger 40 receives a signal, e.g., from the EVSE 16, indicating that wireless charging is available for the vehicle 12. In one example, the charger 40 may enter an alignment mode in response to receiving a signal indicating that wireless charging is available for the vehicle 12.

The charger 40 disables the power rectifier 62 at block 114. In one example, the charger 40 may disable the power rectifier 62 by causing the switch 78 to open. At block 116 the charger 40 enables the precision rectifier 74. In one example, the charger 40 may enable the precision rectifier 74 by causing the switch 76 to close. The charger 40 measures a voltage output by the precision rectifier 74 at block 118. In one example, the voltage output by the precision rectifier 74 may be indicative of current induced in the secondary coil 46 that results from no more than 1 ampere of current being circulated through the primary coil 44.

At block 120 the charger 40 determines whether voltage output of the precision rectifier 74 is greater than a voltage threshold. The charger 40 returns to block 118 where it measures voltage output of the precision rectifier 74 in response to determining at block 120 that voltage output of the precision rectifier 74 is less than a voltage threshold.

The charger 40 at block 122 disables the precision rectifier 74 in response to determining at block 120 that voltage output of the precision rectifier 74 exceeds a voltage threshold. The charger 40 may, for example, disable the precision rectifier 74 by causing the switch 76 to open. In one example, the voltage output of the precision rectifier 74 may be indicative of a distance between the primary coil 44 and the secondary coil 46 and voltage output of the precision rectifier 74 that exceeds a threshold may be indicative that distance between the primary coil 44 and the secondary coil 46 is less than a distance threshold.

The charger 40 may exit the alignment mode in response to determining at block 120 that the voltage output of the precision rectifier 74 exceeds a voltage threshold and following disabling the precision rectifier 74. At block 124 the charger 40 enables the power rectifier 62. In one example, the charger 40 may enable the power rectifier 62 by causing the switch 78 to close. In one example, the charger 40 may be configured to transmit a notification to the EVSE 16 indicating that distance between the primary coil 44 and the secondary coil 46 is less than a distance threshold and the alignment is complete. The charger 40 initiates wireless charging of the traction battery 14 via the power rectifier 62 at block 126. In one instance, the charger 40 may be configured to notify driver of the vehicle 12 that the traction battery 14 is ready to receive energy via a wireless charging session prior to initiating wireless charging of the traction battery 14. At this point the process 110 may end. In some examples, the process 110 may be repeated in response to receiving a signal indicating that wireless charging is available for the vehicle 12 or in response to receiving another signal or request.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle system comprising:
   a controller configured to
      responsive to an alignment mode, disable a power rectifier configured to transfer charge between a secondary coil and battery, and enable a precision rectifier to output a voltage responsive to current induced in the secondary coil resulting from current through a corresponding primary coil, and
      responsive to the voltage exceeding a threshold, enable the power rectifier and disable the precision rectifier.

2. The system of claim 1, wherein the controller is further configured to, responsive to the voltage being less than the threshold, issue commands to prompt a change in position of the secondary coil.

3. The system of claim 1, wherein the controller is further configured to, responsive to the voltage exceeding the threshold, exit the alignment mode.

4. The system of claim 3, wherein the voltage output by the precision rectifier is indicative of a relative alignment between the primary coil and the secondary coil as defined by a coupling coefficient, and wherein the controller is further configured to exit the alignment mode responsive to the coupling coefficient exceeding a specified value.

5. The system of claim 1, wherein the controller is further configured to, responsive to the voltage exceeding the threshold, generate a notification for a charger associated with the primary coil.

6. The system of claim 1, wherein the controller is further configured to enter the alignment mode responsive to a notification from a charger associated with the primary coil.

7. A method for a vehicle comprising:
   responsive to an alignment mode, disabling by a controller a power rectifier configured to transfer charge between a secondary coil and battery, and enabling a precision rectifier to output a voltage responsive to current induced in the secondary coil resulting from current through a corresponding primary coil, and
   responsive to the voltage exceeding a threshold, enabling the power rectifier and disabling the precision rectifier.

8. The method of claim 7 further comprising, responsive to the voltage being less than the threshold, issuing commands to prompt a change in position of the secondary coil.

9. The method of claim 7 further comprising, responsive to the voltage exceeding the threshold, exiting the alignment mode.

10. The method of claim 9, wherein the voltage output by the precision rectifier is indicative of a relative alignment between the primary coil and the secondary coil as defined by a coupling coefficient, and wherein the exiting the alignment mode is further responsive to the coupling coefficient exceeding a specified value.

11. The method of claim 7 further comprising, responsive to the voltage exceeding the threshold, generating a notification for a charger associated with the primary coil.

12. The method of claim 7, wherein the alignment mode is entered responsive to a notification from a charger associated with the primary coil.

13. A method for a vehicle comprising:
   issuing by a controller commands prompting a change in a position of a secondary coil responsive to a voltage across the secondary coil, generated as a result of circulating no more than 1 ampere of current through a primary coil and output by a precision rectifier, being less than a threshold; and enabling a power rectifier to transfer charge between the secondary coil and a battery responsive the voltage being above the threshold.

14. The method of claim 13 further comprising generating a notification for a Charger associated with the primary coil responsive to the voltage exceeding the threshold.

15. The method of claim 13, wherein the voltage across the secondary coil is indicative of a relative alignment between the primary coil and the secondary coil as defined by a coupling coefficient.

16. The system of claim 1, wherein the output voltage of the precision rectifier is directly proportional to a root-mean-square (RMS) input voltage of the precision rectifier.

17. The system of claim 16, wherein the output voltage is approximately equal to the RMS input voltage.

18. The system of claim 1, wherein the precision rectifier amplifies received input voltage to generate the output voltage.

19. The system of claim 18, wherein the precision rectifier includes a pair of inverting amplifiers and a non-inverting amplifier electrically connected with one another that amplify the received input voltage to generate the output voltage.

* * * * *